United States Patent [19]

Rossi

[11] 3,919,304
[45] Nov. 11, 1975

[54] β-HYDROXY-β-(CYCLOALKENYL-PHENYL)ALKANOIC ACIDS( ESTERS AND SALTS

[75] Inventor: Alberto Rossi, Oberwil, Switzerland

[73] Assignee: Ciba-Geigy Corporation, Ardsley, N.Y.

[22] Filed: July 29, 1971

[21] Appl. No.: 167,507

Related U.S. Application Data

[63] Continuation-in-part of Ser. No. 868,592, Oct. 22, 1969, abandoned.

[30] Foreign Application Priority Data

| Oct. 25, 1968 | Switzerland | 16004/68 |
| May 23, 1969 | Switzerland | 7965/69 |
| Sept. 23, 1969 | Switzerland | 14324/69 |

[52] U.S. Cl. ......... 260/520; 260/240 R; 260/243 B; 260/247.7 H; 260/268 BC; 260/293.72; 260/326.8; 260/469; 260/471; 260/473 A; 260/488 CD; 260/501.1; 260/515 R; 260/515 A; 260/518 R; 260/518 A; 260/519; 260/559 R; 424/248; 424/250; 424/267; 424/308; 424/309; 424/311; 424/316; 424/317; 424/319; 424/324

[51] Int. Cl.² ......... C07C 65/14
[58] Field of Search ......... 260/520, 473 A

[56] References Cited

UNITED STATES PATENTS

| 3,228,831 | 1/1966 | Nicholson et al. | 260/515 R |
| 3,385,886 | 5/1968 | Nicholson et al. | 260/515 A |
| 3,435,075 | 3/1969 | Glamkowski | 260/590 |
| 3,452,079 | 6/1969 | Shen et al. | 260/516 X |
| 3,704,313 | 11/1972 | Diamond | 260/520 |
| 3,754,021 | 8/1973 | Shen et al. | 260/515 A |

FOREIGN PATENTS OR APPLICATIONS

| 1,952,360 | 6/1970 | Germany | |
| 1,040,735 | 9/1966 | United Kingdom | 260/473 A |

*Primary Examiner*—John F. Terapane
*Attorney, Agent, or Firm*—Joseph G. Kolodny; Theodore O. Groeger; John J. Maitner

[57] ABSTRACT

Compounds of the formula

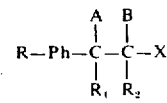

in which X represents a free, esterified or amidated carboxyl group; A represents a free or substituted hydroxyl group or A+B stand for a second carbon-to-carbon bond; B represents a hydrogen atom, together with $R_2$ a divalent hydrocarbon residue of aliphatic character or together with A a second carbon-to-carbon bond; $R_1$ represents a hydrogen atom or a monovalent hydrocarbon residue of aliphatic character; $R_2$ represents a hydrogen atom, a monovalent hydrocarbon residue of aliphatic character or together with B a divalent hydrocarbon residue of aliphatic character; Ph represents a phenylene group optionally substituted by alkyl groups, halogen atoms, trifluoromethyl groups, amino groups and/or nitro groups and R a cycloaliphatic hydrocarbon residue which may be substituted, and their therapeutically acceptable salts are useful as analgesic and anti-inflammatory agents.

5 Claims, No Drawings

β-HYDROXY-β-(CYCLOALKENYLPHENYL)ALKANOIC ACIDS, ESTERS AND SALTS

CROSS-REFERENCE TO RELATED APPLICATION

This is a continuation-in-part application of our copending application Ser. No. 868,592, filed Oct. 22, 1969, now abandoned.

SUMMARY OF THE INVENTION

The present invention relates to new cycloaliphatically substituted β-phenyl-fatty acids and derivatives thereof. Especially it concerns compounds of the general formula

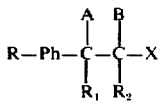

in which X represents a free, esterified or amidated carboxyl group; A represents a free or substituted hydroxyl group such as an alkoxy, alkenyloxy, acyloxy or hydroxyl group, or A+B stand for a second carbon-to-carbon bond; B represents a monovalent hydrocarbon residue of aliphatic character, a hydrogen atom, together with $R_2$ a divalent hydrocarbon residue of aliphatic character or together with A a second carbon-to-carbon bond; $R_1$ represents a hydrogen atom or a monovalent hydrocarbon residue of aliphatic character; $R_2$ represents a hydrogen atom, a monovalent hydrocarbon residue of aliphatic character or together with B a divalent hydrocarbon residue of aliphatic character; Ph represents a phenylene group optionally substituted by alkyl groups, halogen atoms, trifluoromethyl groups, amino groups and/or nitro groups and R a cycloaliphatic hydrocarbon residue which may be substituted, and their therapeutically acceptable salts, as well as pharmaceutical preparations containing those compounds and a process for treating pain and inflammation which consists in administering to a warm blooded being such pharmaceutical preparations.

The cycloaliphatic hydrocarbon residues may be unsubstituted or contain one or several substituents; they are, for example, those containing 4 to 8, especially 5 to 7 cyclic members and are more especially cycloalkenyl residues, in the first place 1-cycloalkenyl residues. Examples of such residues are possibly mono- or polysubstituted cyclobutyl or cyclooctyl or especially cyclopentyl, cyclohexyl or cycloheptyl residues, or in the first place cyclobutenyl or cyclooctenyl, or especially cyclopentyl, cyclohexenyl or cycloheptenyl residues linked in any desired position, such as 3- or 4-cyclohexenyl residues or preferably 1-cyclopentyl, 1-cyclohexenyl or 1-cycloheptenyl residues.

Suitable substituents are for instance hydrocarbon residues of aliphatic character, especially those mentioned below, in the first place lower alkyl residues or alkoxy, alkenyloxy, acyloxy, hydroxyl, oxo, primary, secondary or tertiary amino groups, for which suitable substituents are those mentioned below for the carbamyl groups.

The phenylene residues Ph are preferably meta- or especially para-phenylene residues which may be unsubstituted or contain one, two or more of the above mentioned substituents. Alkyl residues are especially lower alkyl groups.

The term residues of aliphatic character describes those residues whose first member, linked with the carbon atom, is not a member of an aromatic system.

Divalent hydrocarbon residues of aliphatic character are, for example, alkylidene residues such as lower alkylidene residues, especially methylidene or ethylidene residues, or cycloalkylidene residues, in the first place those containing 4 to 7, especially 5 to 7 carbon atoms, for example cyclohexylidene residues, or aralkylidene residues, especially phenyl-lower alkylidene residues, for example benzylidene residues, or alkylene residues, especially those containing 4 to 7, especially 4 or 5 carbon atoms, such as 1,4-butylene, 1,5-pentylene, 1,4-pentylene, 1,6-hexylene or 1,7-heptylene residues. The divalent hydrocarbon residues of aliphatic character can be unsubstituted or substituted, especially in the manner described for the cycloaliphatic hydrocarbon residues. Thus, the cycloalkylidene residues may contain especially lower alkyl residues and the aralkylidene residues may contain on the aromatic ring the substituents indicated for the phenyl-lower alkyl residues.

As monovalent hydrocarbon residues of aliphatic character there are suitable for instance alkyl, alkenyl, alkinyl, cycloalkyl, cycloalkenyl, cycloalkyl-alkyl or -alkenyl residues or cycloalkenyl-alkyl or -alkenyl residues, or aralkyl or aralkenyl residues, for example phenyl-lower alkyl or -alkenyl residues, and more especially lower types of the hydrocarbon residues mentioned.

Lower alkyl residues are, for example, methyl, ethyl, propyl or isopropyl residues, or linear or branched butyl, pentyl or hexyl residues linked in any desired position.

Lower alkenyl residues are for instance allyl or methallyl residues.

A lower alkinyl residue is above all a propargyl group.

Cycloalkyl or -alkenyl residues are, for example, possibly lower alkylated cyclopentyl, cyclohexyl, cycloheptyl, cyclopentenyl, cyclohexenyl or cycloheptenyl residues.

Cycloalkyl-alkyl or -alkenyl residues are in the first place those with lower alkyl or alkenyl residues, especially with those mentioned above and in the first place those with the above-mentioned cycloalkyl residues, such as 1- or 2-cyclopentylethyl, 1-, 2- or 3-cyclohexylpropyl, cycloheptyl-methyl or 1- or 2-cyclohexyl-ethenyl groups.

Cycloalkenyl-alkyl or -alkenyl residues are in the first place those with lower alkyl or alkenyl residues, especially with those mentioned above, and in the first place with the above-mentioned cycloalkenyl residues, such as 1- or 2-cyclopent-3-enyl-ethyl, 1- or 2-cyclohex-1-enyl-ethyl, cyclohept-1-enyl-methyl or 1- or 2-cyclohex-3-enyl-ethenyl groups.

As phenyl-lower alkyl residues there may be mentioned, for example, 1- or 2-phenylethyl residues or benzyl residues whose phenyl nucleus may be substituted for instance by lower alkyl, alkoxy or alkenyloxy groups, halogen atoms, trifluoromethyl groups or similar residues.

Phenyl-lower alkenyl residues are for instance 1- or 2-phenylethenyl residues or cinnamyl residues whose phenyl nucleus may be substituted like the phenyl-lower alkyl residues.

A substituted hydroxyl group is for instance an etherified hydroxyl group, such as an alkoxy or alkenyloxy group, especially one of those mentioned above.

Alkoxy residues are in the first place lower alkoxy residues; for example methoxy, ethoxy, propoxy, isopropoxy, butoxy or amyloxy groups; suitable halogen atoms are especially fluorine, chlorine or bromine atoms.

Alkenyloxy residues are above all lower alkenyloxy residues, for example allyloxy or methallyloxy groups.

Acyloxy residues are in the first place lower alkanoyloxy residues, for example butyryloxy, propionyloxy or especially acetoxy residues.

Esterified carboxyl groups are especially those esterified with aliphatic, cycloaliphatic or araliphatic alcohols. Suitable esterifying alcohols are especially lower alkanols, cycloalkanols or phenylalkanols which may contain further substituents, for example methanol, ethanol, propanols, butanols, hexanols, cyclopentanols, cyclohexanols or phenyl-lower alkanols which may be substituted, for example, as indicated above for the phenyl-lower alkyl residues, such as benzyl alcohols or phenyl-ethanols.

The amide nitrogen atom in the amidated carboxyl groups (carbamyl groups) is unsubstitued, monosubstituted by a hydroxy or amino group or mono- or di-substituted by aliphatic hydrocarbon residues which may be interrupted by hetero atoms such as oxygen, nitrogen or sulphur atoms and/or may be substituted by functional groups such as hydroxyl, amino or mercapto groups or by halogen atoms. As amide substituents there may be mentioned, for example, alkyl, alkenyl or alkylene residues which may be interrupted by oxygen, sulphur or nitrogen atoms and/or may be substituted by functional groups, such as hydroxyl, amino or mercapto groups or by halogen atoms. Suitable amide substituents are especially: lower alkyl residues such as methyl, ethyl, propyl or isopropyl; linear or branched butyl, pentyl, hexyl or heptyl linked in any desired position; lower alkenyl residues, for example allyl or methallyl; lower alkylene residues, for example butylene-(1,4), pentylene-(1,5), hexylene-(1,6) or heptylene-(2,6), or the corresponding residues interrupted by the above-mentioned hetero atoms, for example lower alkoxyalkyl, alkylmercapto-alkyl or mono- or di-lower alkylaminoalkyl residues, for example 2-methoxyethyl, 2-ethoxyethyl, 3-methoxypropyl, 2-methylmercaptoethyl or dimethyl-, methylethyl- or diethylaminoalkyl groups, alkyleneaminoalkyl groups or oxa-, aza or thiaalkyleneaminoalkyl groups, in which the alkylene residues or oxa-, aza- or thia-alkylene residues may be, for example, those mentioned below, or oxa-, aza- or thia-alkylene residues such as 3-oxa-, 3-aza- or 3-thia-pentylene-(1,5), 3-methyl-, 3-ethyl-3-aza-hexylene-(1,6), 3-azahexylene-(1,6) or 4-methyl-4-aza-heptylene(2,6), or groups of this kind substituted by functional groups, such as 3-chloroethyl- or 3-hydroxyethyl-3-aza-pentylene-(1,5); or the above mentioned amide substituents substituted by functional groups, for example 2-hydroxyethyl, 2-hydroxypropyl or hydroxyt.butyl.

The amino group of the amidated carboxyl group (carbamyl group) is especially a free, mono- or di-lower alkylated amino group, or a possibly C-lower alkylated pyrrolidino, piperidino, morpholino, thiomorpholino, piperazino, N'-lower alkylpiperazino or N'-(hydroxy-lower alkyl)-piperazino group, for example the N'-methylpiperazino group or the N'-(β-hydroxyethyl)-piperazino group; or an amino group substituted by a hydroxyl or amino group.

The new compounds possess valuable pharmacological properties, in the first place an analgesic such as antinociceptive and an anti-inflammatory action. Thus, for example, in the Writhing test on the mouse, on oral administration of a dose from 10 to 100 mg/kg they show a distinct action, and in the kaolin oedema test on oral administration of a dose from 10 to 100 mg/kg a distinct anti-inflammatory action. The compounds can therefore be used as antiphlogistics and mild analgesics.

The new compounds are also valuable intermediates for the manufacture of other useful substances, especially of pharmacologically active compounds.

Special mention deserve the compound of the general formula

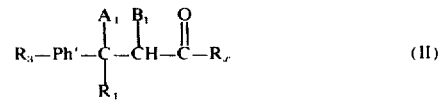     (II)

in which $R_1$ has the above meaning and is especially a hydrogen atom or a lower alkyl residue; $R_3$ represents a cycloalkyl or cycloalkenyl residue with 4 to 7 cyclic members which may be substituted, for example as indicated for R; Ph' represents a meta- or especially para-phenylene residue which may be unsubstituted or substituted by trifluoromethyl groups, halogen atoms and/or lower alkyl groups; $A_1$ represents a hydroxyl group or together with $B_1$ a carbon-to-carbon bond; $B_1$ represents a lower alkyl group or especially a hydrogen atom or together with $A_1$ a carbon-to-carbon bond and $R_{r}$ represents a hydroxyl group, a lower alkoxy group such as methoxy or ethoxy, or a free amino group, a mono- or di-lower alkyl- or -hydroxy-lower alkyl-amino group or a possibly C-lower aklylated pyrrolidino, piperidino, morpholino, N'-lower alkyl-piperazino or N'-hydroxy-lower alkyl-piperazino group.

Specially valuable because of their good anti-in-flammatory and analgesic action are the compounds of the general formula

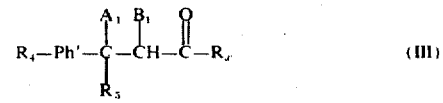     (III)

in which Ph', $A_1$, $B_1$ and $R_{r}$ have the above meanings, $R_4$ represents a 1-cycloalkenyl residue with 5, 6 or 7 cyclic members which may be substituted by lower alkoxy groups and/or especially by lower alkyl groups or is preferably unsubstituted, and $R_5$ represents a hydrogen atom or especially a lower alkyl residue.

Of special importance are the compounds of the general formula

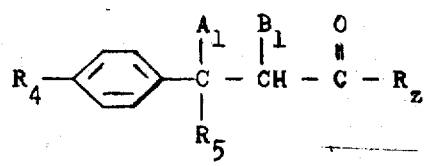

(IV)

in which $R_4$, $R_5$, $A_1$ and $B_1$ have the above meanings and $R_2$ represents a lower alkoxy group, especially one that contains no more than 4 carbon atoms, a free amino group or above all a hydroxy group, and especially the β-hydroxy-β-[p-(1-cyclohexenyl)-phenyl]-butyric acid of the formula

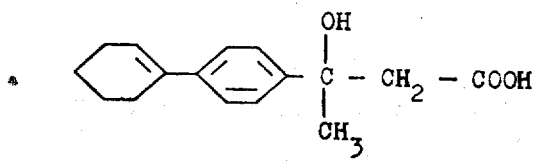

and primarily the β-[p-(1-cyclohexenyl)-phenyl]-crotonic acid of the formula

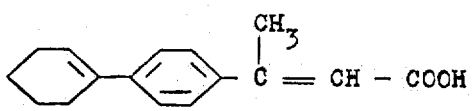

and of all the β-hydroxy-β-[4-(1-cyclohexenyl)-3-methylphenyl]-butyric acid of the formula

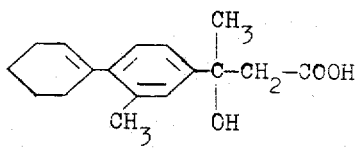

which, when given orally in form of its sodium salt in the kaolin oedema test on the rat paw in a dose of 30 mg/kg displays a pronounced anti-inflammatory action.

The new compounds are obtained by known methods.

Preferably, they are obtained when a compound of the formula

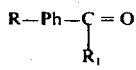

wherein R, Ph and $R_1$ have the above meanings is reacted with an ester of the formula

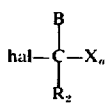

where B and $R_2$ have the above meanings, $X_a$ stands for an esterified carboxyl group and hal for a halogen atom, especially a bromine atom in the presence of zinc, and, if desired, in a resulting compound the esterified carboxyl group is converted into a free or amidated carboxyl group and/or an unsubstituted hydroxyl group A is substituted and/or a second bond A + B is formed.

The Reformatzky reaction is performed in the usual manner, preferably in an inert solvent, such as an aromatic hydrocarbon, for example benzene or toluene.

The new compounds, in which the residue $R_2$ represents a hydrogen atom, are also obtained when a compound of the general formula

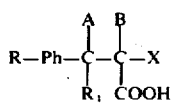 (VI)

in which R, Ph, $R_1$, A and B have the above meanings and X has the meanings given above and stands in the first place for the carboxyl group, is decarboxylated.

The decarboxylation is carried out in the usual manner, for example by gentle warming or heating.

The new compounds are also obtained when a compound of the formula

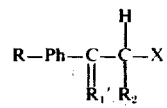 (Xa)

in which $R_1'$ represents a divalent hydrocarbon residue of aliphatic character in which the free valencies emanate from the same carbon atom, and R, $R_2$ and Ph have the meanings indicated, is isomerized with a shift of the double bond resulting. The isomerization can be performed in the usual manner, for example with the action of strong alkalis, for example aqueous or above all alcoholic alkalis, such as those mentioned above, and especially with strong acids, for example, mineral acids, such as those mentioned above, or strong organic acids, for example arylsulfonic acids, such as toluene sulfonic acids.

The new compounds are also obtained when in a compound of the formula

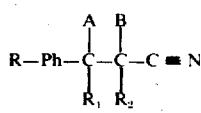

the cyano group is converted into a free, esterified or amidated carboxyl group, e.g. by hydrolysis or alcoholysis.

The hydrolysis to the amidated or free carboxyl group is carried out in known manner, for example in the presence of a strong base, such as an alkali metal hydroxide, for example sodium or potassium hydroxide, or in the presence of a strong acid, for example a mineral acid such as hydrochloric acid, and in the case of the hydrolysis to the free carboxyl group with addition of an oxidant such as nitrous acid.

The alcoholysis to an esterified carboxyl group is carried out in the usual manner, for example by reaction with a corresponding alcohol, for example in the presence of a mineral acid such as sulphuric acid, and advantageously in the presence of ammonium chloride.

In resulting compounds substituents can be introduced, modified or eliminated to suit the definition of the final products.

Thus, for example, in a resulting compound, in which R is a possibly substituted cycloalkenyl residue, R may be converted into a corresponding cycloalkyl residue; this can be achieved more especially by reducing the olefinic double bond in the usual manner, preferably by treatment with hydrogen in the presence of a hydrogenating catalyst, such as a nickel, platinum or palladium catalyst.

Furthermore, for example, residues X in resulting compounds can be converted into one another.

Esterified carboxyl groups and amidated carboxyl groups (that is to say carbamyl groups) can be converted into free carboxyl groups in the usual manner, for example by hydrolysis, preferably in the presence of a strong base or strong acid, for example those mentioned above. If desired, an oxidant, such as nitrous acid, can be added in the hydrolysis of carbamyl groups.

Free or esterified carboxyl groups can also be converted into carbamyl groups in the usual manner, for example by reaction with ammonia or with a corresponding amine containing at least one hydrogen atom on the nitrogen atom and, if necessary, dehydratization of the intermediately formed ammonium salt.

Free carboxyl groups can be esterified in the usual manner, for example by reaction with an appropriate alcohol, advantageously in the presence of an acid such as a mineral acid, for example sulphuric or hydrochloric acid, or by reaction with an appropriate diazo compound, for example a diazoalkane.

Free carboxyl groups can also be converted into acid halide groupings in the usual manner, for example by reaction with thionylchloride, phosphorus pentachloride or phosphorus tribromide. The acid halide groupings can then be converted into esterified carboxyl groups or carbamyl groups respectively in the usual manner, by reaction with an appropriate alcohol, if desired in the presence of an acid acceptor such as an organic or inorganic base, or with ammonia or a corresponding amine having at least one hydrogen atom at the nitrogen atom.

Furthermore, in a resulting compound in which B and/or $R_2$ represent hydrogen, substituents B or $R_2$ respectively can be introduced. For example a corresponding compound, especially an ester or an amide, can be converted into the α-metal salt, for example by reaction with a strong base, such as an amide hydride or hydrocarbon compound of an alkali metal, such as sodium amide or hydride or phenyl lithium or butyl lithium, which is then reacted, preferably without isolation, with a reactive ester of an appropriate alcohol, for example an alcohol of the formula B—OH or $R_2$—OH respectively. A reactive ester is especially an ester with a hydrohalic acid such as hydrochloric, hydrobromic or hydriodic acid, sulphuric acid or with an arylsulphonic acid such as benzene-, p-bromobenzene- or p-toluenesulphonic acid.

Free hydroxyl groups present in resulting compounds can be etherified. The etherificiation is carried out in the usual manner, for example by reaction with a reactive ester of an alkanol, preferably in the presence of a strong base.

Nitro groups on aromatic residues in resulting compounds can be reduced to amino groups, for example with iron and hydrochloric acid.

In a resulting compound, in which B represents a hydrogen atom and A a free hydroxyl group, an α-β-double bond can be introduced by elimination of water, which is carried out in the usual manner, preferably in the presence of a strong acid such as a mineral acid, for example sulphuric acid or a hydrohalic acid, such as hydrochloric or hydrobromic acid.

In a resulting compound, in which A represents a free hydroxyl group, A can be acylated. The acylation is carried out in the usual manner, for example with a halide, such as the chloride, or an anhydride of a carboxylic acid.

By subsequent conversions, as well as with the manufacturing processes, for example by acid hydrolysis of nitriles, the α,β-unsaturated compounds can be obtained when acids are used, possibly with simultaneous elimination of OH.

Depending on the reaction conditions and starting materials acid final products are obtained, that is to say those in which X represents a free carboxyl group, in free form or in form of their salts with bases. Resulting free acid compounds can be converted in the usual manner, for example by reaction with appropriate basic reagents into salts with bases, especially into therapeutically acceptable salts with bases, for example with organic amines, or into metal salts. Suitable metal salts are primarily alkali metal salts or alkaline earth metal salts, such as sodium, potassium, magnesium or calcium salts. From the salts the free acids can be liberated in the usual manner, for example by reaction with acid reagents. These salts and other salts can also be used for purifying the new compounds, for example by converting the free compounds into their salts, isolating the salts and reconverting them into the free compounds. In view of the close relationship between the new compounds in the free form and in form of their salts what has been said above and hereinafter with regard to the free compounds concerns also the corresponding salts wherever this is possible and useful.

Depending on the choice of the starting materials and reaction conditions and on the number of asymmetric carbon atoms the new compounds may result as optical antipodes, racemates or isomer mixtures (racemate mixtures) or as cis-/trans-isomer mixtures.

A resulting isomer mixture (racemate mixture) can be resolved on the basis of the physico-chemical differences of the constituents in known manner into the two stereoisomeric (diastereomeric) pure racemates or isomers respectively, for example by chromatography and/or fraction crystallization.

Resulting racemates can be resolved into the diastereomers by known methods, for example by recrystallization from an optically active solvent, or with the aid of microorganisms or by reaction of a free carboxylic acid with an optically active base capable of forming salts with the racemic compound and separation of the salts thus obtained, for example on the basis of their different solubilities, and from the diastereomers the antipodes can be liberated with suitable reagents. A particularly frequently used optically active base is, for example, the D- or L-form of cinchonin. It is advantageous to isolate the more active of the two antipodes.

The invention includes also any variant of the present process in which an intermediate obtainable at any stage thereof is used as starting material and any remaining step(s) is/are carried out or in which a starting material is formed under the reaction conditions or a reactant may be used in form of a salt thereof.

The reactions of the present invention are advantageously carried out with the use of starting materials that lead to the groups of final products specially mentioned above and in the first place to the specifically described or emphasized final products.

The starting materials are known or, insofar as they are new, they can be prepared by known methods. New starting materials are likewise included in the present invention.

The starting materials of the formula Xa are preferably obtained when in a compound of the formula

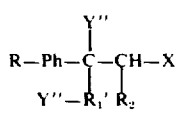

in which R, Ph, $R_1'$, $R_2$ and X have the meanings indicated and one of the radicals Y'' is a free or reactive esterified hydroxyl group, e.g. a hydroxyl group or a halogen atom, such as chlorine or bromine, and the other is a hydrogen atom, the two residues Y'' are split off in the usual manner.

When one of the symbols Y'' represents a reactive esterified hydroxyl group such as a halogen atom, the reaction is preferably carried out in a basic medium, for example in the presence of an inorganic base, such as a metal hydroxide, for example sodium or potassium hydroxide, or a carbonate such as sodium or potassium carbonate, or of an organic amine, for example pyridine, and if desired at an elevated temperature. If one of the radicals Y'' is a hydroxyl group, it is preferably split off in the presence of a strong acid such as a mineral acid, for example sulfuric acid or a hydrohalic acid, such as hydrochloric or hydrobromic acid. When the residue Y'' situated on the residue $R_1'$ is the hydrogen atom, the elimination may take two different courses, wherefore as a rule compounds of the formula I and as by-products compounds of the formula X$a$ are formed which can be separated in per se conventional manner, for example by chromatography and/or fractional crystallization.

Furthermore, the afore-described isomerization, which is an equilibrium reaction, can also be employed for the preparation of compounds of the formula X$a$ from the compounds of this invention corresponding to the formula I.

In resulting starting materials substituents may be introduced, converted or eliminated to suit the definition of the starting materials. This may be done especially in the manner described for the end products.

What has been stated in connection with the end products about salts, optical antipodes, racemates and isomer mixtures, preparation from intermediates, in situ formation of starting materials and use of starting materials in the form of salts, equally applies to the new starting materials.

The new compounds can be used, for example, in form of pharmaceutical preparations containing them in free form or if desired in form of their non-toxic salts, especially the therapeutically acceptable alkali metal salts, in conjunction or admixture with an organic or inorganic, solid or liquid pharmaceutical excipient suitable, for example, for enteral, parenteral or local administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules, suppositories, creams or ointments, or in liquid form solutions (for example elixirs or syrups), suspensions or emulsions. They may be sterilized and/or contain aids such as preserving, stabilizing, wetting or emulsifying agents, solubilizers, salts for regulating the osmotic pressure or buffers. They may also contain further therapeutically valuable substances. The pharmaceutical preparations are formulated by known methods.

The following Examples illustrate the invention.

EXAMPLE 1

4.25 Grams of granulated zinc, which had been washed with chloroform and activated with iodine, are covered with 100 ml of absolute benzene. The whole is heated to 80°C and one quarter of a solution of 10 g of ethyl α-bromoacetate and 10 g of p-(1-cyclohexenyl)-acetophenone in 50 ml of benzene is cautiously stirred in. After a short waiting period and, if necessary local stronger heating on the reaction vessel, the remaining three quarters of the solution mentioned above one dropped in. Finally, the batch is refluxed for 2 hours. The reaction mixture is then cooled to 10°C, 200 ml of 2N-sulphuric acid are stirred in and the benzene layer is separated in a separating funnel. The organic phase is washed with N-sulphuric acid, dilute ammonia solution, saturated sodium carbonate solution and with water, dried over magnesium sulphate, filtered and evaporated, to yield ethyl-β-hydroxy-β-[p-(1-cyclohexenyl)-phenyl]-butyrate of the formula

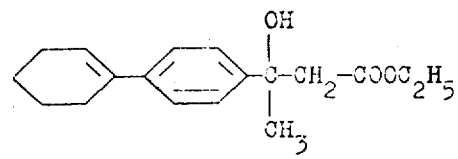

in the form of a faintly yellowish oil.

EXAMPLE 2

A solution of 12 g of ethyl-β-hydroxy-β-[p-(1-cyclohexenyl)-phenyl]-butyrate obtained as described in Example 1 in 200 ml of ethanol is mixed with 150 ml of 2N-sodium hydroxide solution and heated for 3 hours on a waterbath at 50° – 60°C. The bulk of ethanol is evaporated under vacuum, the residue diluted with water, and the solution is treated with active carbon, filtered and acidified with 2N-hydrochloric acid. The precipitated crystals are taken up in methylenechloride, and the solution is dried over magnesium sulphate, filtered and evaporated under vacuum. By recrystallization of the solid residue from ether+petroleum β-hydroxy-β-[p-(1-cyclohexenyl)-phenyl]-butyric acid of the formula

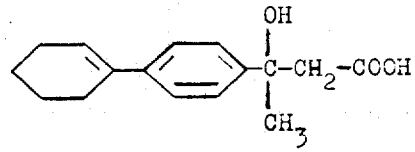

is obtained in colourless crystals melting at 118° – 120°C.

The sodium salt of this acid is prepared by reaction with the calculated amount of aqueous 2N-sodium hydroxide solution and evaporation of the solution; it is soluble in water to an extent of 5%.

EXAMPLE 3

A solution of 5 g of β-hydroxy-β-[p-(1-cyclohexenyl)-phenyl]- acid in 50 ml of glacial acetic acid is mixed with 10 ml of N-hydrochloric acid and heated for 15 minutes at 100°C, then cooled in an icebath. The precipitated crystals are filtered off, dried and recrystallized from ether+petroleum ether to yield β-[p-(1- cyclohexenyl)-phenyl]-crotonic, acid of the formula

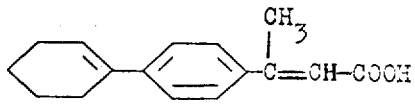

as faintly yellowish crystals melting at 167° – 171°C.

EXAMPLE 4

12.7 Grams of zinc chips are washed with chloroform, activated with iodine and then covered with 300 ml of absolute benzene. The mixture is heated to 80°C and a solution of 30 g of p-(1-cyclohexenyl)-acetophenone and 35 g of ethyl α-bromopropionate in 50 ml of benzene is cautiously stirred in, making sure that the Reformatzky reaction does not become too energetic. The batch is refluxed for 3 hours, then cooled, and the benzene solution is agitated with 300 ml of 2N-sulphuric acid, with 150 ml of 2N-soda solution and 2 × 100 ml of water, dried over sodium sulphate and evaporated under vacuum, to yield ethyl-α-methyl-β-hydroxy-β-[p-(1-cyclohexenyl)-phenyl]-butyrate of the formula

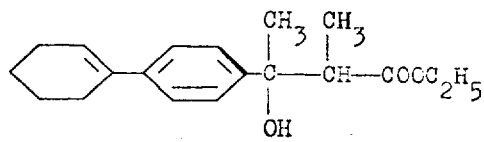

as a faintly yellowish oil.

The p-(1-cyclohexenyl)-acetophenone used as starting material can be prepared thus:

A well-stirred suspension of 9.8 g of magnesium chips, which have been washed with chloroform and activated with iodine, in 150 ml of absolute tetrahydrofuran is mixed at 60°C dropwise with a solution of 96 g of 2-(p-bromophenyl)-2-methyl-1,3-dioxolan in 150 ml of tetrahydrofuran. The dropping rate is adjusted so that after the reaction has set in the temperature does not rise above 60°C. Towards the end the batch is heated for 30 minutes at 60°C, then cooled to 5°C, and 35 g of cyclohexanone are stirred in dropwise. The batch is heated for 1 hour at 50° – 60°C, and the reaction mixture is filtered off and evaporated in a rotary evaporator. The residue is mixed with ice and a saturated aqueous ammoniumchloride solution, extracted with ether, dried over magnesium sulphate and evaporated; the residue is recrystallized from ether+petroleum ether, to yield 2-[p-(1'-hydroxy-1'-cyclohexyl)-phenyl]-2-methyl-1,3-dioxolan melting at 117° – 118°C.

A solution of 80 g of this compound in 200 ml of glacial acetic acid is mixed with 30 ml of concentrated hydrochloric acid and 50 ml of water, then heated on a waterbath for 3 hours at 80°C. Water is added until no turbidity occurs, and the precipitated crystals are filtered off, dried and recrystallized from petroleum ether, to yield p-(1-cyclohexenyl)-acetophenone melting at 76° – 77°C.

EXAMPLE 5

A solution of 36 g of ethyl-α-methyl-β-hydroxy-β-[p-(1-cyclohexenyl)-phenyl]-butyrate in 200 ml of ethanol is mixed with 40 ml of 10N-sodium hydroxide solution and kept for 16 hours at room temperature, then evaporated under vacuum. The solid residue is taken up in 2 litres of water, the insoluble matter is filtered off and while cooling with ice the reaction mixture is acidified with 5N-hydrochloric acid, then extracted with ether, dried over sodium sulphate and evaporated. The oily residue is dissolved in 100 ml of ethanol and the calculated quantity of sodium ethylate is added. By precipitation with ether, filtering and drying under vacuum at 60°C the sodium salt of α-methyl-β-hydroxy-β-[p-(1-cyclohexenyl)-phenyl]-butyric acid of the formula

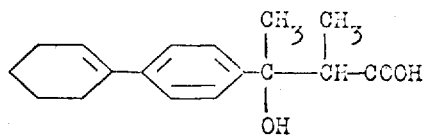

is obtained in the form of a white powder.

EXAMPLE 6

11.8 Grams of zinc chips washed with chloroform and activated with iodine are covered with 100 ml of absolute benzene heated to 80°C and slowly mixed with a part of the solution of 27.8 g of ethylbromoacetate and 27.8 g of m-(1-cyclohexenyl)-acetophenone in 140 ml of absolute benzene. When the Reformatzky reaction sets in, the remainder of the aforementioned solution is stirred in dropwise. The whole is then refluxed for 2 hours, and allowed to cool. The reaction solution is mixed with 400 ml of ice-cold 2N-sulphuric acid, the benzene layer is separated in a separating funnel and washed successively with 100 ml of ice-cold 2N-sulphuric acid, 50 ml of dilute ammonia solution, 50 ml of saturated cold soda solution and finally with water. The benzene solution is dried over sodium sulphate and evaporated under vacuum, and the residue is distilled under a high vacuum, to yield ethyl β-hydroxy-β-[m-(1-cyclohexenyl)-phenyl]-butyrate of the formula

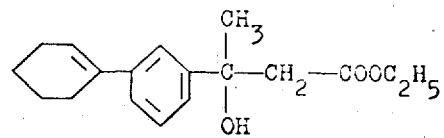

as a colorless oil which boils at 180°C under 0.1 mm Hg pressure.

The m-(1-cyclohexenyl)acetophenone used as starting material in this Example can be prepared thus:

A mixture of 294 g of m-bromoacetophenone, 164 g of ethyleneglycol, 4.2 g of p-toluenesulphonic acid, 0.5 ml of concentrated sulphuric acid and 2100 ml of benzene is refluxed in a 4.5 liter reactor equipped with a water separator until the formation of water has practically ceased. After 16 hours, the batch is cooled, agitated with 200 ml of saturated soda solution and washed with water, dried over sodium sulphate and evaporated under vacuum. The resulting oily residue no longer displays a carbonyl band in the infrared spectrum and is 2-(m-bromophenyl)-2-methyl-1,3-dioxolan.

A well-stirred suspension of 18.45 g of magnesium washed with chloroform and activated with iodine in 250 ml of absolute tetrahydrofuran is mixed at 65°–70°C with a solution of 180.7 g of 2-(m-bromophenyl)-2-methyl-1,3-dioxolan in 180 ml of absolute tetrahydrofuran which is dropped in at such a rate that after the reaction has set in the temperature does not rise above 65°–70°C. Finally, the whole is heated for 1 hour at 65°–70°C, then cooled to 20°C, diluted with 370 ml of tetrahydrofuran and while stirring and cooling with ice 64.7 g of cyclohexanone are dropped in, while ensuring that the temperature does not rise above 30°C. The batch is allowed to react for 1 hour at 30°–40°C, then evaporated under vacuum and the residue is mixed with ice and 600 ml of saturated aqueous ammonium chloride solution, extracted with 3 × 300 ml of ether, the ether layers are washed with ammonium chloride, dried over sodium sulphate and evaporated under vacuum. The residue is fractionated under a high vacuum; the main fraction, which passes over at 142°–145°C under 0.02 mm Hg pressure, is dissolved in 50 ml of ether, and 400 ml of petroleum ether are added, whereupon 2-[m-(1-hydroxy-cyclohexyl)-phenyl]-2-methyl-1,3-dioxolan crystallizes out; it melts at 58.5°–59.5°C.

A solution of 38 g of this substance in 380 ml of glacial acetic acid is mixed with 18.7 ml of concentrated hydrochloric acid and 3.8 ml of water and heated for 1 hour at 60°C, then cooled, mixed with 700 ml of water and extracted with ether. The ether phases are washed with ice-cold 2N-sodium hydroxide solution, dried over sodium sulphate and evaporated under vacuum. The residue is distilled under a high vacuum and yields m-(1-cyclohexenyl)acetophenone as a thickly liquid oil boiling at 140°C under 0.05 mm Hg pressure.

EXAMPLE 7

A solution of 17 g of ethyl β-hydroxy-β-[m-(1-cyclohexenyl)-phenyl]-butyrate in 300 ml of ethanol is mixed with 212 ml of 2N-sodium hydroxide solution and heated for 1 ½ hours at 60°C, then evaporated under vacuum; the residue is taken up in water and acidified with 2N-hydrochloric acid, extracted with methylenechloride, and the extract is washed with water, dried over sodium sulphate and evaporated under vacuum. The oily residue is dissolved in 50 ml of ethanol, mixed with the calculated quantity of sodium ethylate, precipitated with ether, filtered off and dried under vacuum at 60°C, to yield the sodium salt of β-hydroxy-β-[m-(1-cyclohexenyl)-phenyl]-butyric acid of the formula

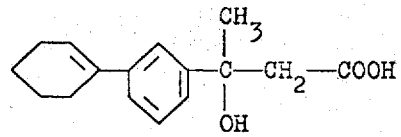

as a colorless powder.

EXAMPLE 8

A solution of 11 g of β-hydroxy-β-[m-(1-cyclohexenyl)-phenyl]-butyric acid in 110 ml of glacial acetic acid is mixed with 22 ml of concentrated hydrochloric acid and heated for 15 minutes at 90°C, then cooled, 120 ml of water are added and the whole is extracted with ether. The ether extracts are washed with water and evaporated. The residue is dissolved in saturated sodium bicarbonate solution, washed 3 times with ether, acidified with 2N-hydrochloric acid, extracted with ether, dried over sodium sulphate, evaporated, and the solid residue is crystallized from ether+petroleum ether, to yield β-[m-(1-cyclohexenyl)-phenyl]-crotonic acid of the formula

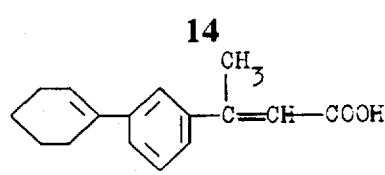

in the form of colorless crystals melting at 128°–131°C.

The sodium salt of this acid dissolves in water to an extent of about 10%.

EXAMPLE 9

A solution of 16.3 g of ethyl β-hydroxy-β-[m-(1-cyclohexenyl)-phenyl]-butyrate in 160 ml of ethanol is hydrogenated in the presence of 1.6 g of platinum oxide under 1 atmosphere (gauge) pressure at 20°C until the calculated quantity of hydrogen has been consumed. On completion of the hydrogenation, which takes 18 hours, the catalyst is filtered off and the filtrate evaporated in a rotary evaporator, to yield ethyl β-hydroxy-β-(m-cyclohexyl-phenyl)-butyrate of the formula

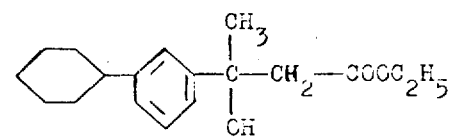

as a thickly liquid, colorless oil.

EXAMPLE 10

A solution of 16 g of ethyl β-hydroxy-β-(m-cyclohexyl-phenyl)-butyrate in 280 ml of ethanol is mixed with 200 ml of 2N-sodium hydroxide solution and heated for 1 ½ hours at 60°C, then evaporated under vacuum, the solid residue is taken up in water, extracted with ether, and the aqueous phase is acidified with concentrated hydrochloric acid and extracted with methylenechloride. The methylenechloride extracts are washed with water, dried over sodium sulphate and evaporated under vacuum. The oily residue is dissolved in 25 ml of ethanol and a solution of sodium ethylate (from 1.35 g of sodium) in 35 ml of ethanol is added. The whole is evaporated under vacuum and yields the sodium salt of β-hydroxy-β-(m-cyclohexyl-phenyl)-butyric acid of the formula

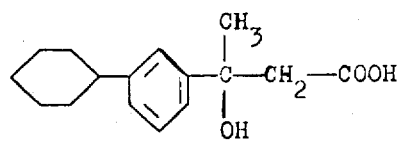

as a white powder.

EXAMPLE 11

13 Grams of zinc chips are washed with chloroform and activated with iodine and then covered with 130 ml of absolute benezene. The whole is heated to 80°C and, while being stirred, cautiously mixed with one-quarter of a solution of 31.7 g of p-(1-cycloheptenyl)-acetophenone and 26 g of ethyl bromoacetate in 150 ml of absolute benzene. After waiting for a short time and, if necessary, more energetic local heating of the reaction vessel, the reaction sets in. Then the remainder of the mixture mentioned above can be dropped in. The batch is refluxed for 2 hours, then cooled, 400 ml of 2N-sulphuric acid are stirred in, and the benezene layer is separated in a separating funnel. The organic phase is washed with N-sulphuric acid, dilute ammonia solution, saturated soda solution and with water, dried over sodium sulphate, filtered and evaporated, to yield ethyl β-hydroxy-β-[p-(1-cycloheptenyl)-phenyl]-butyrate ester of the formula

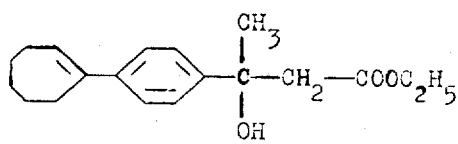

as a faintly yellowish oil.

The p-(1-cycloheptenyl)-acetophenone used as starting material can be prepared thus:

A well-stirred suspension of 14.6 g of magnesium chips, which have been washed with chloroform and activated with iodine, in 150 ml of absolute tetrahydrofuran is mixed at 60°C dropwise with a solution of 97.6 g of 2-(p-(bromophenyl)-2-methyl-1,3-dioxolan in 500 ml of tetrahydrofuran at such a rate that after the reaction has set in the temperature does not rise above 60°C. Finally, the whole is heated for 30 minutes at 60°C, cooled to 20°C and 67 g of cycloheptanone are stirred in dropwise. The batch is heated for 1 hour at 50° to 60°C and then evaporated. The residue is mixed with ice and 200 ml of a saturated aqueous ammonium chloride solution. The whole is extracted with ether, dried over sodium sulphate and evaporated. The residue is recrystallized from ether+petroleum ether, to yield 2-[p-(1-hydroxy-cycloheptyl)-phenyl]-2-methyl-1,3-dioxolan as a colorless, crystalline compound melting at 78° – 80°C.

A solution of 43 g of this compound in 240 ml of glacial acetic acid and 90 ml of 2N-hydrochloric acid is heated for 1 hour at 100°C, then cooled, 300 ml of water are added, the whole is extracted with ether, washed with 2N-sodium bicarbonate solution, and the ether extracts are dried over sodium sulphate and evaporated. The oily residue is distilled under a high vacuum and yields p-(1-cycloheptenyl)-acetophenone as a thickly liquid oil which boils at 140°C under 0.04 mm Hg pressure.

EXAMPLE 12

A solution of 39.5 g of ethyl β-hydroxy-β-[p-(1-cycloheptenyl)-phenyl]-butyrate in 300 ml of ethanol is mixed with 50 ml of 5N-sodium hydroxide solution and heated for 2 hours at 40° to 60°C, then cooled and evaporated under vacuum; the residue is mixed with water and concentrated hydrochloric acid, extracted with methylenechloride, washed with water, dried over sodium sulphate and evaporated under vacuum. The solid residue is recrystallized from ether+petroleum ether and furnishes β-hydroxy-β-[p-(1-cycloheptenyl)-phenyl]-butyric acid of the formula

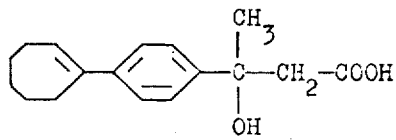

in colorless crystals melting at 128°–130°C. The sodium salt obtained therefrom decomposes at 236°–238°C.

EXAMPLE 13

A solution of 21 g of β-hydroxy-β-[p-(1-cycloheptenyl)-phenyl]-butyric acid in 600 ml of dioxane is mixed with 60 ml of concentrated hydrochloric acid and heated and stirred for 2 hours at 60°–70°C, then concentrated under vacuum to half its volume, mixed with 300 ml of water and the solid precipitate is filtered off, dissolved in ether+methylenechloride (1:1), dried with sodium sulphate and evaporated. The residue is recrystallized from ether+petroleum ether and yields β-[p-(1-cycloheptenyl)-phenyl]-crotonic acid of the formula

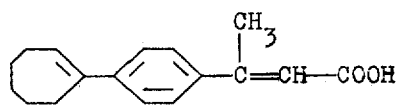

in white crystals melting at 136°–138°C.

EXAMPLE 14

17 Grams of zinc chips are washed with chloroform, activated with iodine and covered with 130 ml of absolute benzene. The whole is heated to 80°C, and one quarter of a solution of 35.2 g of p-(1-cyclopentenyl)-acetophenone and 33.4 g of ethyl bromoacetate in 150 ml of absolute benzene is slowly added. When the Reformatzky reaction has set in, the remainder of the above-mentioned solution can be dropped in. Finally, the batch is refluxed for 2 hours, then cooled and 500 ml of 2N-sulphuric acid are stirred in; the benzene layer is separated in a separating funnel, washed successively with 100 ml of 2N-sulphuric acid, 100 ml of dilute ammonia solution, 100 ml of saturated sodium carbonate solution and with water. The benzene solution is dried over sodium sulphate and evaporated under vacuum, to yield an oily residue which is distilled under a high vacuum. The resulting ethyl β-hydroxy-β-[p-(1-cyclopentenyl)-phenyl]-butyrate of the formula

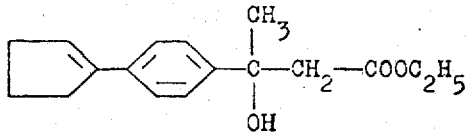

forms a colorless oil which boils at 150° – 170°C under 0.02 mm Hg pressure.

The p-(1-cyclopentenyl)-acetophenone used as starting material can be prepared in the following manner:

A well-stirred suspension of 7.3 g of magnesium chips, which have been washed with chloroform and activated with iodine, in 150 ml of absolute tetrahydrofuran is mixed dropwise at 60°C with a solution of 48.6 g of 2-(p-bromophenyl)-2-methyl-1,3-dioxolan in 100 ml of tetrahydrofuran, at a rate such that after the reaction has begun the temperature does not rise above 60°C. Finally, the batch is heated for 30 minutes at 60°C, then cooled to 20°C, and 21.6 g of cyclopentanone are stirred in dropwise. The mixture is heated for 1 hour at 50°–60°C, then evaporated and the residue mixed with ice and 200 ml of saturated aqueous ammonium-chloride solution, extracted with ether, dried over sodium sulphate and evaporated. The residue is recrystallized from ether+petroleum ether, to yield 2-[p-(1-hydroxy-cyclopentyl)-phenyl]-2-methyl-1,3-dioxolan melting at 90°–91°C.

A solution of 15 g of this compound in 80 ml. of glacial acetic acid and 30 ml of 2N-hydrochloric acid is heated for 1 hour at 100°C, cooled, diluted with 200 ml of water and extracted with ether. The ether layers are washed with 2N-sodium bicarbonate solution, dried over sodium sulphate and evaporated. After recrystallization from ether+petroleum ether the residue yields p-(1-cyclopentenyl)-acetophenone melting at 100° – 102°C.

EXAMPLE 15

A solution of 33.4 g of ethyl β-hydroxy-β-[p-(1-cyclopentenyl)-phenyl]butyrate in 250 ml of ethanol is mixed with 40 ml of 5N-sodium hydroxide solution and heated for 2 hours at 50° to 60°C, then evaporated under vacuum, mixed with water, filtered, and the clear aqueous solution is acidified with concentrated hydrochloric acid, extracted with methylenechloride, dried over sodium sulphate, evaporated and the solid residue is recrystallized from ether+petroleum ether to yield β-hydroxy-β-[p-(1-cyclopentenyl)-phenyl]-butyric acid of the formula

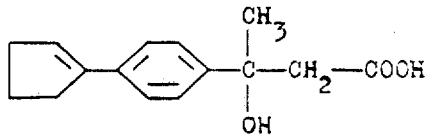

in the form of colorless crystals melting at 120–122°C; its sodium salt decomposes at 232° – 234°C.

EXAMPLE 16

A solution of 10 g of β-hydroxy-β-[p-(1-cyclopentenyl)-phenyl]-butyric acid in 300 ml of dioxane is mixed with 45 ml of concentrated hydrochloric acid and heated for 2 hours at 60°–70°C, then cooled, evaporated under vacuum to 2/3, mixed with water and the solid precipitate is filtered off, dissolved in ether+methylenechloride (1:1), dried over sodium sulphate and evaporated. The solid residue is recrystallized from ether+petroleum ether, to yield β-[p-(1-cyclopentenyl)-phenyl]-crotonic acid of the formula

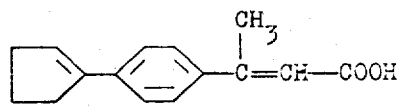

in the form of faintly yellowish crystals melting at 180°–182°C; its sodium salt decomposes above 300°C.

EXAMPLE 17

5.5 Grams of zinc chips are washed with chloroform, activated with iodine and convered with 150 ml of absolute benzene. The whole is heated to 80°C and while stirring it, one quarter of a solution of 14 g of ethyl bromoacetate and 16 g of p-(4-methoxy-1-cyclohexenyl)-acetophenone in 50 ml of benzene is cautiously added. After waiting for a short time and, if necessary, stronger local heating of the reaction vessel, the remaining three-fourths of the above-mentioned solution are dropped in. Finally, the batch is heated for 2 hours under reflux. The reaction mixture is then cooled to 10°C, 200 ml of 2N-sulphuric acid are stirred in and the benzene layer is separated in a separating funnel. The organic phase is successively washed with N-sulphuric acid, dilute ammonia solution, saturated soda solution and with water, dried over magnesium sulphate, filtered and evaporated, to yield crude ethyl β-hydroxy-β-[p-(4-methoxy-1-cyclohexenyl)-phenyl]-butyrate of the formula

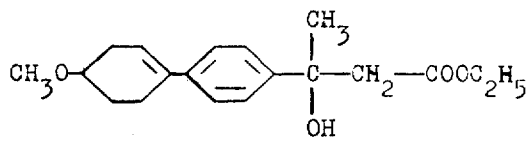

as a faintly yellowish oil.

The p-(4-methoxy-1-cyclohexenyl)-acetophenone used as starting material is accessible by the following route:

A well-stirred suspension of 14.5 g of magnesium chips, which have been washed with chloroform and activated with iodine, in 150 ml of absolute tetrahydrofuran is mixed at 60°C dropwise with a solution of 121 g of 2-(p-bromophenyl)-2-methyl-1,3-dioxolan in 500 ml of absolute tetrahydrofuran at a rate such that after the reaction has begun the temperature does not rise above 60°C. Finally, the batch is heated for 30 minutes at 60°C, then cooled to 5°C and 77 g of 4-methoxy-cyclohexanone are stirred in dropwise. The batch is heated for 1 hour at 50° to 60°C, then filtered and evaporated in a rotary evaporator. The residue is mixed with ice and a saturated aqueous ammoniumchloride solution, extracted with ether, dried over sodium sulphate and evaporated. The residue is recrystallized from ether+petroleum ether, to yield 2-[p-(4-methoxy-1-hydroxy-cyclohexyl)-phenyl]-2-methyl-1,3-dioxolan melting at 137°–140°C.

A solution of 55 g of this compound in 120 ml of glacial acetic acid is mixed with 20 ml of concentrated hydrochloric acid and 40 ml of water. The mixture is heated for 2 hours at 80°–90°C, then cooled, mixed with 2 liters of water and extracted with ether. The ether residue is distilled under a high-vacuum at 160°–170°C under 0.1 mm Hg pressure and then recrystallized from petroleum ether, to yield p-(4-methoxy-1-cyclohexenyl)-acetophenone melting at 40°–42°C.

EXAMPLE 18

A solution of 20 g of ethyl β-hydroxy-β-[p-(4-methoxy-1-cyclohexenyl)-phenyl]-butyrate in 150 ml of ethanol is mixed with 40 ml of 5N-sodium hydroxide solution and this mixture is kept for 16 hours at room temperature, then evaporated under vacuum. The residue is dissolved in water, acidified with 5N-hydrochloric acid and extracted with ether. The ether extracts are washed with water, dried over sodium sulphate and evaporated under vacuum and the residue is recrystallized from ether+petroleum ether, to yield β- hydroxy-β-[p-(4-methoxy-1-cyclohexenyl)-phenyl]-butyric acid of the formula

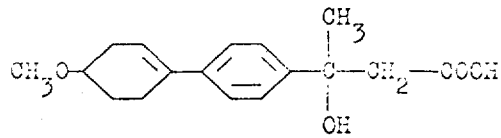

in colorless crystals melting at 93°–94°C.

EXAMPLE 19

6.3 Grams of zinc chips are washed with chloroform and activated with iodine and then covered with 150 ml of absolute benzene. The whole is heated to 80°C and one quarter of a solution of 16.2 g of ethyl bromoacetate and 16 g of a mixture of p-(2-methyl-1-cyclohexenyl)-acetophenone and p-(6-methyl-1-cyclohexenyl)-acetophenone in 50 ml of benzene is cautiously stirred in. AFter waiting for a short time and, if necessary, with stronger local heating of the reaction vessel, the remaining three-fourths of the above mentioned solution are dropped in. Finally, the whole is refluxed for 2 hours. The reaction mixture is cooled to 10°C, 200 ml of 2N-sulphuric acid are stirred in and the benzene layer is separated in a separating funnel. The organic phase is washed successively with N-sulphuric acid, dilute ammonia solution, saturated sodium carbonate solution and with water, dried over magnesium sulphate, filtered and evaporated, to yield a mixture of ethyl-β-hydroxy-β-[p-(6-methyl-1-cyclohexenyl)-phenyl]-butyrate and ethyl-β-hydroxy-β-[p-(2-methyl-1-cyclohexenyl)-phenyl]-butyrate of the formulae

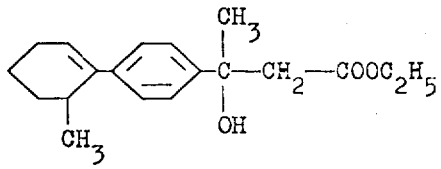

and

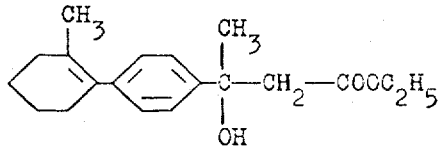

as a faintly yellowish oil.

The ketone mixture used as starting material can be prepared thus:

A well-stirred suspension of 8.8 g of magnesium chips, which have been washed with chloroform and activated with iodine, in 150 ml of absolute tetrahydrofuran is mixed at 60°C dropwise with a solution of 23 g of 2-[p-bromophenyl]-2-methyl-1,3-dioxolan in 450 ml of absolute tetrahydrofuran at such a rate that after the reaction has begun the temperature does not rise above 60°C. Finally, the batch is heated for 30 minutes at 60°C, then cooled to 5°C and 41 g of 2-methylcyclohexanone are stirred in dropwise. The reaction mixture is heated for 1 hour at 50°–60°C, then filtered off amd evaporated in a rotary evaporator. The residue is mixed with ice and a saturated aqueous ammoniumchloride solution, extracted with ether, and the ether extract is dried over sodium sulphate and evaporated. The residue is recrystallized from ether+petroleum ether, to yield 2-[p-(2-methyl-1-hydroxycyclohexyl)-phenyl]-2-methyl-1,3-dioxolan melting at 77°–80°C.

A solution of 33 g of this compound in 150 ml of glacial acetic acid is mixed with 80 ml of 2N-hydrochloric acid and heated for 1 hour at 100°C, then cooled, mixed with 700 ml of water, extracted with 2 × 300 ml of petroleum ether and the extracts are dried over sodium sulphate and evaporated. The residue is distilled under a high vacuum, to yield a 7:3-mixture of p-(6-methyl-1-cyclohexenyl)-acetophenone and p-(2-methyl-1-cyclohexenyl)-acetophenone as a faintly yellowish oil boiling at 130°–140°C under 0.2 mm Hg pressure.

EXAMPLE 20

A solution of 14 g of the mixture of ethyl-β-hydroxy-β-[p-(2-methyl-1-cyclohexenyl)-phenyl]-butyrate and ethyl-β-hydroxy-β-[p-(6-methyl-1-cyclohexenyl)-phenyl]-butyrate, obtained in Example 19, in 150 ml of ethanol is mixed with 30 ml of 5N-sodium hydroxide solution and kept for 16 hours at room temperature, then evaporated under vacuum, 300 ml of water are added, the batch is acidified with 2N-hydrochloric acid and extracted with ether. The ether extracts are washed with water, dried over sodium sulphate and evaporated under vacuum and the residue is recrystallized from ether+petroleum ether, to yield β-hydroxy-β-[p-(6-methyl-1-cyclohexenyl)-phenyl]-butyric acid of the formula

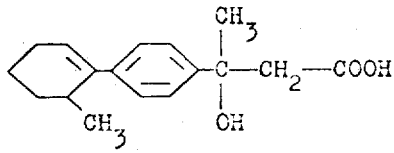

in colorless crystals melting at 107°–109°C. This acid is contaminated with a small quantity of the isomer β-hydroxy-β-[p-(2-methyl-1-cyclohexenyl)-phenyl -butyric acid and can be purified by recrystallization.

EXAMPLE 21

A solution of 9 g of a mixture of ethyl-β-hydroxy-β-[p-(6-methyl-1-cyclohexenyl)-phenyl]-butyrate and ethyl-β-hydroxy-β-[p-(2-methyl-1-cyclohexenyl)-phenyl]-butyrate in 150 ml of ethanol is hydrogenated in the presence of 1.5 g of platinum oxide under a hydrogen pressure of 1 atmosphere (gauge) at room temperature. When the calculated quantity of hydrogen has been absorbed, the catalyst is filtered off and the filtrate evaporated under vacuum, to leave as an oily residue ethyl-β-hydroxy-β-[p-(2-methyl-cyclohexyl)-phenyl]-butyrate of the formula

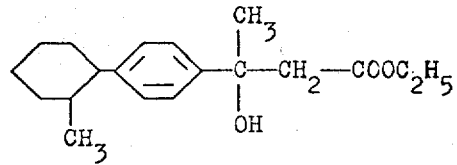

EXAMPLE 22

A solution of 8 g of ethyl-β-hydroxy-β-[p-(2-methyl-cyclohexyl)-phenyl]-butyrate in 100 ml of ethanol is mixed with 20 ml of 5N-sodium hydroxide solution and heated for 3 hours at 50°C, then evaporated under vacuum; the residue is dissolved in 200 ml of water, filtered off, acidified with 2N-hydrochloric acid and extracted with ether. The ether extract is dried over sodium sulphate and evaporated under vacuum, to leave a solid residue which on crystallization from ether+petroleum ether yields β-hydroxy-β-[p-(2-methylcyclohexyl)-phenyl]-butyric acid of the formula

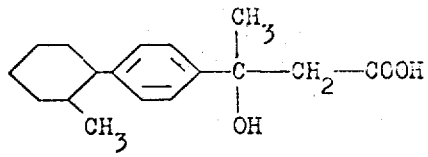

in colorless crystals melting at 113–115°C.

EXAMPLE 23

12.7 Grams of granulated zinc, which had been washed with chloroform and activated with iodine, are covered with 200 ml of absolute benzene. The mixture is heated to 80°C and mixed with part of a solution of 35 g of ethyl-α-bromopropionate and 30 g of p-cyclohexyl-acetophenone in 100 ml of absolute benzene. When the reaction has started, the remainder of the above-mentioned solution is dropped in. Finally, the batch is refluxed for 2 hours and then kept for 16 hours, then, while being cooled with ice, mixed with 200 ml of 2N-sulphuric acid, the benzene layer is separated in a separating funnel and washed with 2N-sodium carbonate solution and with water, dried over sodium sulphate and evaporated under vacuum, to yield ethyl-α-methyl-β-hydroxy-β-(p-cyclohexyl-phenyl)-butyrate of the formula

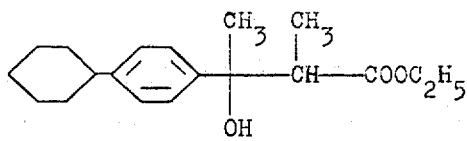

as a thickly liquid, pale-yellow oil.

EXAMPLE 24

A solution of 49 g. of ethyl-α-methyl-β-hydroxy-β-(p-cyclohexyl-phenyl)-butyrate in 300 ml of ethanol is mixed with 100 ml of 5N-sodium hydroxide solution and heated for 3 hours at 60°–70°C, then evaporated under vacuum. The residue is taken up in 1 liter of water, the solution treated with animal charcoal, filtered and acidified with 5N-hydrochloric acid, extracted with ether and the extract is dried over sodium sulphate and evaporated under vacuum to furnish as a solid residue α-methyl-β-hydroxy-β-(p-cyclohexyl-phenyl)-butyric acid of the formula

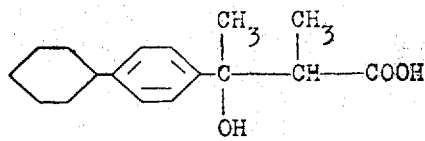

On crystallization from ether+petroleum ether one diastereoisomer (melting at 186°–187°C) precipitates while the other diastereoisomer (melting at 120°–122°C) is obtained from the mother liquor.

EXAMPLE 25

10.5 Grams of granulated zinc, which had been washed with chloroform and activated with iodine, are covered with 100 ml of absolute benzene. The mixture is heated to 80°C and, while being stirred, cautiously mixed with part of a solution of 28 g of ethyl bromoacetate and 3-chloro-4-cyclohexylacetophenone in 100 ml of absolute benzene. When the Reformatzky reaction has set in, the remainder of the above-mentioned solution is stirred in dropwise. Finally, the whole is refluxed for 2 hours, cooled to 10°C, 200 ml of 2N-sulphuric acid are stirred in; the benzene phase is separated in a separating funnel and washed successively with 100 ml of 2N-sulphuric acid, 100 ml of ice-cold dilute ammonia solution, and with water. The benzene solution is dried over sodium sulphate and evaporated under vacuum, to furnish as a thickly liquid resiude ethyl-β-hydroxy-β-(m-chloro-p-cyclohexylphenyl)-butyrate of the formula

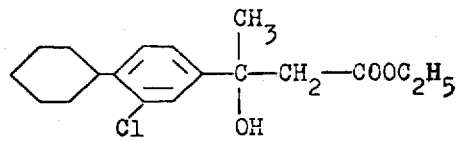

EXAMPLE 26

A solution of 45 g of ethyl-β-hydroxy-β-(m-chloro-p-cyclohexyl-phenyl)-butyrate in 400 ml of ethanol is mixed with 300 ml of 2N-sodium hydroxide solution and heated for 1½ hours at 60°C, then evaporated under vacuum, dissolved in water and acidified with concentrated hydrochloric acid. An oily precipitate is obtained from which the water is decanted; then it is taken up in methylenechloride, the undissolved matter is filtered off, and the filtrate is dried over sodium sulphate and evaporated under vacuum. The solid residue is recrystallized from petroleum ether and yields β-hydroxy-β-(m-chloro-p-cyclohexyl-phenyl)-butyric acid of the formula

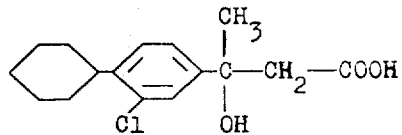

in colorless crystals melting at 106°–108°C.

EXAMPLE 27

A solution of 9 g of β-hydroxy-β-(m-chloro-p-cyclohexyl-phenyl)-butyric acid in 70 ml of glacial acetic acid is mixed with 20 ml of 2N-hydrochloric acid and heated for 1 hour at 100°C, then cooled, mixed with water, the aqueous layer is decanted from the precipitated oil, the oil is taken up in ether, dried over sodium sulphate and evaporated under vacuum. The solid residue is recrystallized from petroleum ether, to yield β-(m-chloro-p-cyclohexylphenyl)crotonic acid of the formula

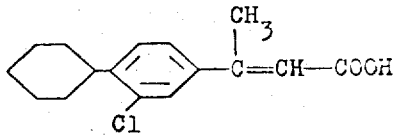

in faintly yellowish crystals melting at 150°–153°C.

EXAMPLE 28

8.5 Grams of granulated zinc, which had been washed with chloroform and activated with iodine, are covered with 300 ml of absolute benzene. The mixture is heated to 80°C and, while stirring it, it is cautiously mixed with part of a solution of 20 g of ethyl bromoacetate and 20 g of p-cyclohexyl-acetophenone in 100 ml of absolute benzene. When the Reformatzky reaction has set in, the remainder of the above-mentioned solution is stirred in dropwise. Finally, the whole is refluxed for 2 hours, then cooled to 10°C, 200 ml of 2N-sulphuric acid are stirred in, and the benzene layer is separated in a separating funnel and washed successively with 100 ml of 2N-sulphuric acid, 100 ml of ice-cold dilute ammonia solution and with water. The benzene solution is dried over sodium sulphate and evaporated under vacuum, to furnish ethyl-β-hydroxy-β-(p-cyclohexyl-phenyl)-butyrate of the formula

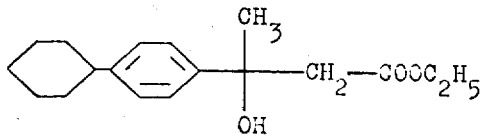

as a faintly yellowish oil.

EXAMPLE 29

A solution of 30 g of ethyl-β-hydroxy-β-(p-cyclohexyl-phenyl)-butyrate in 400 ml of ethanol is mixed with 300 ml of 2N-sodium hydroxide solution and heated for 2 hours at 60° to 70°C, then evaporated under vacuum. The residue is taken up in water and the solution is acidified with 5N-hydrochloric acid. The solid white precipitate is filtered off and dissolved in methylenechloride. The methylenechloride solution is washed with water, dried over sodium sulphate and evaporated. The resulting residue is recrystallized from ether+petroleum ether and yields β-hydroxy-β-(p-cyclohexyl-phenyl)-butyric acid of the formula

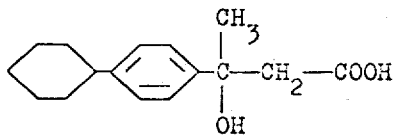

in colorless crystals melting at 133°–135°C.

EXAMPLE 30

A solution of 5 g of para-cyclohexyl-benzylidene malonic acid in 50 ml of diphenyl ether is refluxed for 20 minutes. The solution is then cooled, diluted with 150 ml of ether, and extracted with N-sodium hydroxide solution. The alkaline aqueous solution is washed with ether, acidififed with 2N-hydrochloric acid, and the solid precipitate is filtered off, washed with water, and dried at 60°C under reduced pressure. On recrystallization from ether+petroleum ether, β-(para-cyclohexyl-phenyl)-acrylic acid of the formula

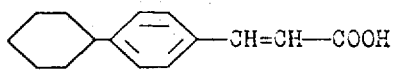

is obtained in the form of white crystals which melt at 198°–200°C.

This compound can also be obtained when the paracyclohexyl-benzylidene-malonic acid is heated at 160°C until the evolution of $CO_2$ ceases.

The para-cyclohexyl-benzylidene-malonic acid used as starting material in this Example can be prepared as follows:

A solution of 60 g of para-cyclohexyl-benzoic acid in 600 ml of chloroform is treated with 45 ml of thionyl chloride and refluxed for 4 hours. The solution is then evaporated under reduced pressure, the residue dissolved in 1000 ml of benzene, and ammonia is introduced into the benzene solution until saturation is achieved. The resulting precipitate is filtered off, suspended in 1000 ml of water, and filtered again. On drying in vacuum at 100°C and recrystallization from ethanol, para-cyclohexylbenzoic acid amide is obtained in the form of white crystals of melting point 213°–215°C.

195 g of this acid amide are refluxed with 1.2 liters of phosphorus oxychloride for 12 hours. The bulk of the phosphorus oxychloride is distilled off, the rest is evaporated under reduced pressure and the oily residue is poured on to 500 g of ice. The batch is then extracted with methylene chloride, washed with ice water and dilute sodium carbonate solution, dried over sodium sulfate, evaporated, and the residue distilled in a high vacuum. para-Cyclohexyl-benzonitrile is obtained as a faintly yellow oil boiling at 110°–115°C under a pressure of 0.1 mm Hg.

Dry HCl gas is introduced for 5 hours into a suspension of 120 g of anhydrous stannic chloride in 800 ml of absolute ether until two layers have formed. The batch is then treated with 80 g of para-cyclohexyl-benzonitrile, after which dry HCl gas is again introduced for 3 hours. Stirring is continued for another 4 hours, and the batch then allowed to stand for 16 hours. After evaporation in a rotary evaporator under reduced pressure, the residue is treated with 1,000 ml of water, and the whole refluxed for 2 hours and, after cooling, extracted with chloroform. The chloroform layer is dried over sodium sulfate, evaporated under reduced pressure, and the residue distilled in a high vacuum to obtain para-cyclohexyl-benzaldehyde as a faintly yellow oil boiling at 100°–110°C under a pressure of 0.08 mm of Hg.

In a flask equipped with a stirrer, a reflux condenser and a water separator, 10 g of para-cyclohexylbenzaldehyde, 0.4 g of para-cyclohexyl-benzoic acid, 0.52 g of piperidine, 9.6 g of diethyl malonate and 30 ml of benzene are refluxed for 4 hours, the water formed being separated. The batch is then cooled, diluted with 60 ml of benzene, and extracted in turn with 60 ml of $H_2O$, 60 ml of N-hydrochloric acid, and 60 ml of saturated sodium bicarbonate solution. The benzene layer is dried over sodium sulfate, evaporated under reduced pressure, and the oily residue distilled in a high vacuum. In this manner, diethyl-para-cyclohexyl-benzylidene-malonate is obtained, which is dissolved in 100 ml of ethanol, the solution is treated with 25 ml of 5N-sodium hydroxide solution, and allowed to stand at room temperature for 16 hours. The batch is evaporated under reduced pressure, diluted with 50 ml of water, acidified with 2N-hydrochloric acid, and extracted with ether. When the ether residue is recrystallized from benzene, para-cyclohexyl-benzylidenemalonic acid is obtained in the form of white crystals melting at 150°–154°C (with decomposition).

EXAMPLE 31

In a round flask equipped with a reflux condenser and a water separator, a solution of 60.3 g of ethyl-β-hydroxy-β-[para-(1-cyclohexenyl)-phenyl]-butyrate in 300 ml of absolute toluene is boiled for 2 hours in the presence of 3 g of toluene sulfonic acid. After that time, water is no longer split off. The toluene solution is cooled, treated with activated charcoal, filtered off, and extracted with 150 ml of 2N-sodium hydroxide solution, and the extract washed with water, then evaporated under reduced pressure.

On recrystallization from ether+petroleum ether, there are obtained faintly green crystals of melting point 84°–86°C which are a mixture of ethyl-β-[para-(1-cyclohexyl)-phenyl]-crotonate of the formula

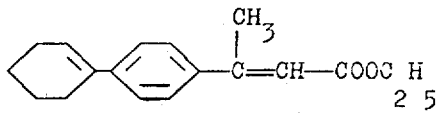

and ethyl-β-methylene-β-[para-(1-cyclohexenyl)-phenyl]-propionate of the formula

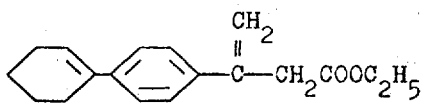

EXAMPLE 32

A solution of 23.8 g of a mixture of ethyl-β-[para(1-cyclohexenyl)-phenyl]-crotonate and ethyl-β-methylene-β-[para-(1-cyclohexenyl)-phenyl]-propionate in 100 ml of methanol is mixed with a solution of 8 g of potassium hydroxide in 5 ml of water and 20 ml of methanol, and refluxed for 3 hours. The batch is cooled, 100 ml of water added, and the bulk of the methanol distilled off in a rotary evaporator under reduced pressure. The aqueous solution is washed with ethyl acetate and acidified with 2N-hydrochloric acid, pale yellow crystals precipitating. The latter are filtered off with suction, washed with water, and dried at 60°C under reduced pressure. When subjected to fractional recrystallization from toluene, they yield β-[para-(1-cyclohexenyl)-phenyl]-crotonic acid of the formula

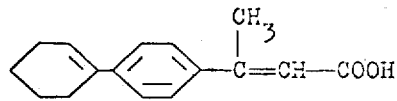

in the form of faintly yellow crystals melting at 167°–172°C, and β-methylene-β-[para-(1-cyclohexenyl)-phenyl]-propionic acid of the formula

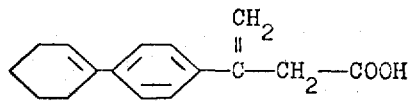

in the form of colorless crystals melting at 125°–126°C. The first-mentioned compound is identical with the compound obtained according to Example 3.

EXAMPLE 33

In a round flask equipped with a reflux condenser and a water separator, a solution of 20 g of ethyl-α-methyl-β-hydroxy-β-[para-(1-cyclohexenyl)-phenyl]-butyrate in 300 ml of absolute toluene is boiled for 2 hours in the presence of 2 g of toluene sulfonic acid. After that time, no more water separates. The toluene solution is cooled, treated with active charcoal, filtered, extracted with 150 ml of 2N-sodium carbonate solution, washed with water, and evaporated under reduced pressure.

The residue yields a red-brown oil which is a mixture of ethyl-α-methyl-β-[para-(1-cyclohexenyl)-phenyl]-crotonate of the formula

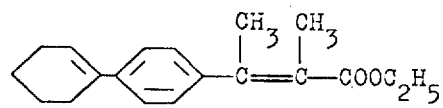

and ethyl-α-methyl-β-methylene-β-[para-(1-cyclohexenyl)-phenyl]-propionate of the formula

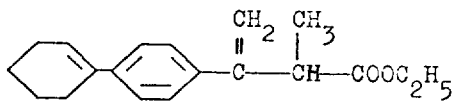

EXAMPLE 34

A solution of 20 g of a mixture of ethyl-α-methyl-β-[para-(1-cyclohexenyl)-phenyl]-crotonate and ethyl-α-methyl-β-methylene-β-[para-(1-cyclohexenyl)-phenyl]-propionate in 400 ml of ethanol is treated with 100 ml of 5N-sodium hydroxide solution and heated at 60°C for 2 hours. The batch is cooled, treated with 200 ml of water, and, after evaporation under reduced pressure of the bulk of the ethanol, acidified with concentrated hydrochloric acid, and extracted with methylene chloride.

The oily residue is dissolved in pentane, and the solution allowed to stand. White crystals precipitate, which on recrystallization from pentane yield α-methyl-β-methylene-β-[para-(1-cyclohexenyl)-phenyl]-propionic acid of the formula

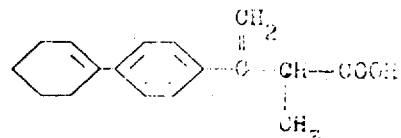

in the form of colorless crystals melting at 89°–90°C. (NMRspectrum (100 Mc), CCl₄: inter alia doublet at 5.27 ppm for the two vinyl protons of the methylene group).

EXAMPLE 35

A mixture of 7.5 g of 3-chloro-4-cyclohexyl-benzaldehyde, 3 ml of pyridine and 6 g of malonic acid is heated for 2 hours to 120°C. Upon cooling, the mixture is treated with ice water, acidified with 5N hydrochloric acid and the precipitated solid filtered off. This solid is dissolved in ether, the ether solution washed with water, dried over sodium sulphate and concentrated in vacuo to a third of its volume. Colourless crystals of β-(3-chloro-4-cyclohexyl-phenyl)-acrylic acid of the formula

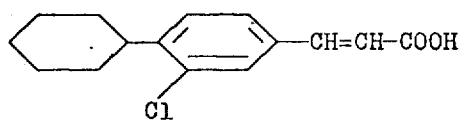

are precipitated (m.p. 198°–202°C).

The 3-chloro-4-cyclohexyl-benzaldehyde used as starting material in this Example can be obtained as follows:

A solution of 300 g of sodium hyroxide in 1200 ml of water is cooled to 0°C and treated with 360 g of bromine within 45 minutes. The batch is subsequently warmed to 30°–40°C and a solution of 100 g of 3-chloro-4-cyclohexyl-acetophenone in 800 ml of dioxan is added dropwise thereto within 75 minutes. The mixture is left to stand for 16 hours, treated with 200 g of sodium bisulphite and evaporated to a third of its volume. The residue is treated with 1,000 ml of water, acidified with concentrated hydrochloric acid and the crystals which have precipitated are filtered off. These crystals are dissolved in chloroform, the solution is dried over sodium sulphate and and evaporated in vacuo. After recrystallisation from ether/petroleum ether, the solid residue yeilds the 3-chloro-4-cyclohexyl-benzoic acid (m.p. 173°–175°C).

A solution of 86.5 g of 3-chloro-4-cyclohexyl-benzoic acid in 600 ml of chloroform is treated with 120 ml of thionyl chloride and boiled under reflux for 4 hours. The reaction mixture is then evaporated in vacuo. The oily acid chloride is dissolved in 600 ml of benzene and ammonia is passed into the solution for 90 minutes, in the process of which a solid precipitate forms. After evaporation in a rotary evaporator, the residue is dissolved in 60% ethanol, treated with water and the crystals which have precipitated are filtered off. After drying in vacuo at 90°–100°C, the 3-chloro-4-cyclohexyl-benzamide is obtained (m.p. 180°–181°C).

A solution of 70 g of this acid amide in 500 ml of phosphorous oxychloride is boiled under reflux for 12 hours. The mixture is then evaporated in a rotary evaporator, the residue carefully treated with ice and water, made alkaline with saturated soda solution and extracted with methylene chloride. The methylene chloride solution is washed with water, dried over sodium sulphate and evaporated in vacuo to yield the crude 3-chloro-4-cyclohexyl-benzonitrile.

Hydrogen chloride gas is passed for 3 hours and with stirring into a suspension of 90 g of anhydrous tin chloride in 600 ml of ether, in the process of which two layers form. 60 Grams of 3-chloro-4-cyclohexylbenzonitrile are added and dry hydrogen chloride gas is once more passed into the mixture for 3 hours. The batch is left to stand for 16 hours and evaporated to dryness. The residue is treated with 1000 ml of water and the mixture boiled under reflux for 1 hour. After cooling, extraction with chloroform, drying the extract over sodium sulphate and evaporating it in vacuo, the residual oil is distilled in a high vacuum to yield the 3-chloro-4-cyclohexyl-benzaldehyde which boils at 100°C (0.15 mmHg).

EXAMPLE 36

A mixture of 20 g of p-(1-cyclohexenyl)-benzaldehyde, 12.3 g of malonic acid and 5 g of pyridine is heated for 1 hour to 100°C. After approx. half an hour the contents of the flask congeal. The mixture is cooled to room temperature, treated with 200 ml of 2N hydrochloric acid and extracted with ether. The etheral extracts are washed with water, dried over sodium sulphate and evaporated. Recrystallization from methylene chloride/petroleum ether yields the p-(1-cyclohexenyl)-cinnamic acid of the formula

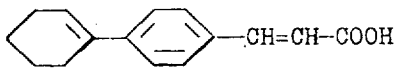

in the form of colourless crystals which melt at 208°–215°C (with decomp.).

The p-(1-cyclohexenyl)-benzaldehyde used as starting material in this Example can be manufactured as follows:

A solution of 7 g of p-(1-cyclohexenyl)-phenylbromide in 100 ml of absolute ether is treated while stirring and under nitrogen at 5°C with 50 ml of a solution of 4.3 g of n-butyllithium in absolute ether. The reaction mixture is brought to room temperature, stirred for 30 minutes at 30°C, then cooled to 20°C and treated dropwise with a solution of 4 g of N-methyl-N-formylaniline in 50 ml of absolute ether, whereby the internal temperature rises to 30°C. After the reaction solution has been allowed to continue to react for 30 minutes at room temperature, it is poured into 100 ml of ice cold 2N hydrochloric acid and extracted with ether layers are washed with water, dried over sodium sulphate and evaporated in vacuo. The residue is distilled under a high vacuum to yield the p-(1-cyclohexenyl)-benzaldehyde (b.p. 110°–120°C at 0.2 mm Hg).

EXAMPLE 37

A solution of 8.7 g of crude p-(1-cyclohexenyl)-β-methyl-cinnamoyl chloride (prepared from p-(1-cyclohexenyl)-β-methyl-cinnamic acid using thionyl chloride) in 15 ml of absolute tetrahydrofurane is slowly added dropwise with stirring at −10°C to 4.2 g of n-propylamine and 4.0 g of triethylamine in 50 ml of absolute tetrahydrofurane. Stirring is continued thereafter for 3 hours at room temperature. For processing, the reaction mixture is partitioned between water and methylene chloride. The organic phase is washed with 0.1 N hydrochloric acid, with saturated sodium bicarbonate solution and with water, dried over sodium sulphate and evaporated to dryness in vacuo. Treatment of the residue with methylene chloride yields the crystalline p-(1-cyclohexenyl)-β-methyl-cinnamic acid-n-propylamide of the formula

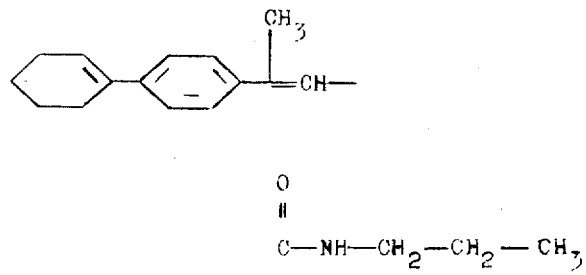

EXAMPLE 38

A solution of 9.6 g of β-[4-(1-cyclohexenyl)-phenyl]-crotonic chloride in 100 ml of absolute methylene chloride is slowly added dropwise with stirring at −5°C to 5.5 g of β-amino-β-methyl-propanol and 4 g of triethylamine in 50 ml of absolute methylene chloride. Stirring is continued for 3 hours at room temperature and the reaction mixture is then partitioned between N hydrochloric acid and 200 ml of methylene chloride at 0°C. The organic phase is washed with saturated sodium bicarbonate solution and water, dried over sodium sulphate and evaporated in vacuo. Crystallisation from ether/petroleum ether yields the crude β-[4-(1- cyclohexenyl)-phenyl]-crotonic acid-(hydroxy-t.butyl)-amide of the formula

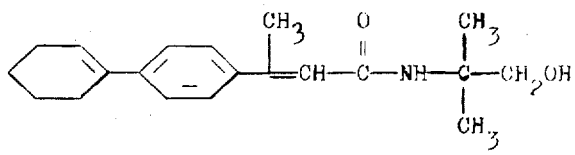

The product melts at 161°–168°C after it has been recrystallised a further 3 times from methylene chloride/ether.

EXAMPLE 39

A solution of 18.3 g of bromoethyl acetate and 18 g of 3-methyl-4-(1-cyclohexenyl)-acetophenone in 200 ml of absolute benzene is slowly added dropwise with stirring at 80°C to a suspension of 7.1 g of zinc chips (washed with chloroform and activated with iodine) in 100 ml of absolute benzene. The mixture is boiled under reflux for 10 hours under anhydrous conditions, then cooled to 10°C and extracted with 200 ml of 2N sulphuric acid. The organic phase is washed with N sulphuric acid, saturated aluminium chloride solution, N soda solution and then with water, dried over sodium sulphate and evaporated in vacuo. The residue consists of β-hydroxy-β-[4-(1-cyclohexenyl)-3-methyl-phenyl]-butyric acid ethyl ester of the formula

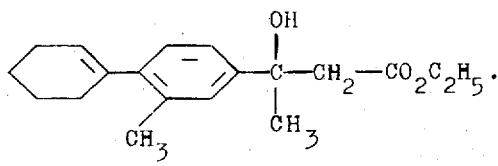

The 3-methyl-4-(1-cyclohexenyl)-acetophenone used as starting material can be obtained as follows:

A solution of 46.4 g of 4-bromo-3-methyl-acetophenone [A. F. Dokukina et al, Zhur. Obschei-Kheni, 26, 1651–3 (1956)] and 40.8 g of ethylene glycol in 700 ml of benzene and 2 ml of concentrated sulphuric acid is boiled for 6 hours with a water separator. The reaction mixture is then cooled to room temperature and extracted with saturated soda solution. The organic phase is washed until neutral, dried over sodium sulphate and evaporated to dryness in vacuo. The residue is distilled in vacuo at 0.07 mm. The fraction boiling at 84°–85°C contains the 3-methyl-4-bromacetophenone-ethylenedioxyketal.

To a suspension of 4.8 g of magnesium chips (activated with iodine) in 100 ml of absolute tetrahydrofurane are added dropwise with stirring and under anhydrous conditions 46 g of the above ketal in 50 ml of absolute tetrahydrofurane, in such a manner that the temperature never rises above 50°C. When the magnesium is wholly dissolved, the solution is cooled to room temperature and 17.5 g of cyclohexanone in 50 ml of absolute tetrahydrofurane is added slowly dropwise. The batch is then stirred for 1 hour at 40°C and evaporated in vacuo. The residue is partitioned between saturated ammonium chloride solution and ether. The ether phase is washed with water, dried over sodium sulphate and evaporated in vacuo. The crude 3-methyl-4-(hydroxycyclohexyl)-acetophenone-ethylenedioxy-ketal is treated with 300 ml of glacial acetic acid and 5 ml of concentrated hydrochloric acid and the batch is boiled under reflux for 3 hours, then evaporated in vacuo to approx. 30 ml volume. The residue is partitioned between petroleum ether and 2N sodium hydroxide solution at 0°C. The organic phase is washed until neutral, dried over sodium sulphate and evaporated in vacuo. The residue is distilled at 0.05 mm. The fraction boiling at 111°–120°C contains the 3-methyl-4-(1-cyclohexenyl)-acetophenone.

EXAMPLE 40

20 Millilitres of concentrated sodium hydroxide solution are added to 24 g of crude β-hydroxy-β-[4-(1-cyclohexenyl)-3-methyl-phenyl]-butyric acid ethyl ester in 200 ml of ethanol and 20 ml of water and the mixture is stirred for 3 hours at room temperature. The mixture is then evaporated to dryness in vacuo at room temperature and the residue is partitioned between ether and water. The aqueous phase is carefully acidified at 0°C with 2N hydrochloric acid and extracted with ether. The organic phase is washed until neutral, dried over sodium sulphate and evaporated in vacuo. Crystallisation from petroleum ether yields the β-hydroxyβ-4-(1-cyclohexenyl)-3-methyl-phenyl-butyric acid of the formula

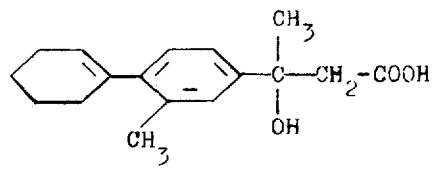

(m.p. 70°–72°C).

EXAMPLE 41

Tablets containing 100 mg of β-hydroxy-β-[4-(1-cyclohexenyl)-phenyl]-butyric acid may be prepared with the following ingredients:

|  | Per tablet |
|---|---|
| β-hydroxy-β-[4-(1-cyclohexenyl)-phenyl]-butyric acid | 100 mg |
| lactose | 50 mg |
| wheat starch | 73 mg |
| colloidal silicic acid | 13 mg |
| talc | 12 mg |
| magnesium stearate | 2 mg |
|  | 250 mg |

Method

The active substance is mixed with the lactose, part of the wheat starch, and with colloidal silicic acid, and the mixture passed through a sieve. Another portion of the wheat starch is pasted with the five-fold quantity of water on a water bath, and the powder mixture is kneaded with the paste until a slightly plastic mass is obtained. The mass is forced through an about 3 mm mesh sieve, dried, and the dry granulate is again passed through a sieve. Then the remainder of the wheat starch, talc and magnesium stearate are admixed. The resulting mixture is compressed into tablets of 250 mg each.

EXAMPLE 42

In an analogous manner as described in Examples 1-34 there may be obtained the following compounds:

β-methoxy-β-[para-(1-cyclooctenyl)-phenyl]-butyric acid amide,

β-hydroxy-β-[ortho-trifluoromethyl-para-(4-oxo-cyclohexyl)-phenyl]-n-valeric acid diethylamide, β-acetoxy-β-[3,5-dibromo-4-(2-hydroxy-cyclohexyl)-phenyl]-propionic acid benzyl ester, α-ethyl-β-[meta-methoxy-para-(4-dimethylamino-1-cycloheptenyl)-phenyl]-crotonic acid morpholide, β-hydroxy-β-vinyl-β-[para-(3-amino-cyclohexyl)-phenyl]-propionic acid β-dimethylamino-ethylamide, β-allyloxy-β-cyclopentyl-β-[meta-(4-acetoxy-1-cyclohexenyl)-phenyl]-propionic acid, β-hydroxy-ethylamide, β-ethoxy-β-benzyl-β-[meta-(4-ethylamino-cyclohexyl)-phenyl]-propionic acid p-chlorobenzyl ester, β-propionyloxy-γ-cycloheptyl-β-[para-(4-allyloxy-cyclohexyl)-phenyl]-butyric acid cyclopentyl ester β-methallyloxy-β-(4-methyl-cyclohexyl)-β-[para-(3-isopropyl-1-cyclopentenyl)-phenyl]-propionic acid β-methoxyethylamide, β-hydroxy-β-(2-cyclohexyl-vinyl)-β-[para-(3-oxo-1-cycloheptenyl)-phenyl]-propionic acid β-methylaminoethylamide, α,α-dimethyl-β-ethoxy-β-(meta-cyclobutyl)phenyl)-propionic acid β-thiomorpholino-ethylamide, α-(1-cyclopentenyl)-β-[para-(3-isopropylamino-1-cycloheptenyl)-phenyl]-acrylic acid meta-methoxy-benzyl ester, α-ethyl-α-(1-cyclohexenyl-methyl)-β-isopropoxy-β-[para-(5-hydroxy-cyclooctyl)-phenyl]-propionic acid β-chloro-ethylamide, α-cycloheptyl-β-hydroxy-β-[meta-(3-cycloheptenyl)-phenyl]-butyric acid methyl ester, β-(meta-chloro-benzyl)-β-hydroxy-β-[meta-(4-allyloxy-1-cyclohexenyl)-phenyl]-propionic acid cycloheptylamide, β-[2-(1-cyclohexenyl)-vinyl]-β-hydroxy-β-[para-(2-hydroxy-cyclobutyl)-phenyl]-propionic acid para-trifluoromethylanilide, β-[2-(para-fluoro-phenyl)-vinyl]-β-[para-(3-dimethylamino-1-cycloheptenyl)-phenyl]-acrylic acid meta-methoxy-benzylamide, α-(p-methoxy-benzyl)-β-hydroxy-β-[meta-(3-hydroxy-1-cyclohexenyl)-phenyl]-propionic acid ortho-bromo-anilide, β-[2-(o-ethoxy-phenyl)-vinyl]-β-methoxy-β-[para-(3-methoxy-1-cyclohexenyl)-phenyl]-propionic acid, β-cyclohexylidene-β-[meta-(4-hydroxy-1-cycloheptenyl)-phenyl]-propionic acid meta-fluoro-benzyl ester, β-benzylidene-β-[meta-(3-oxo-cyclohexyl)-phenyl]-propionic acid N-methyl-piperidide, β-(meta-chloro-benzylidene)-β-[para-(3-dimethylamino-cyclopentyl)-phenyl]-propionic acid para-methoxy-anilide and β-(para-ethoxy-benzylidene)-β-[ortho-fluoro-para-(4-methoxycyclooctyl)-phenyl]-propionic acid diethyl-amide.

I claim:

1. A compound of the formula

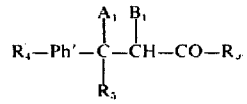

in which Ph' represents meta-or para-phenylene or such phenylene substituted by trifluoromethyl, halogen or lower alkyl, $A_1$ is hydroxy, $B_1$ is lower alkyl or hydrogen, $R_x$ is hydroxy or lower alkoxy and $R_4$ is 1-cycloalkenyl with 5, 6 or 7 carbon atoms or said 1-cycloalkenyl substituted by lower alkoxy or lower alkyl and $R_5$ is lower alkyl, or a therapeutically acceptable salt of the compounds with $R_x$ being hydroxy.

2. A compound as claimed in claim 1 and corresponding to the formula

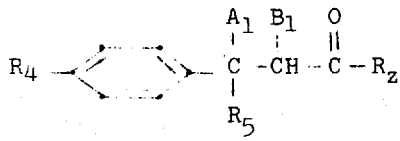

in which $R_4$, $R_5$, $A_1$ And $B_1$ have the meaning given in claim 1 and $R_z$ is lower alkoxy with up to 4 carbon atoms or hydroxy, or a therapeutically acceptalbe salt of the compounds with $R_z$ being hydroxy.

3. A compound as claimed in claim 1, said compound being β-hydroxy-β-[para-(1-cyclohexenyl)-phenyl]-butyric acid or a therapeutically acceptable salt thereof.

4. A compound as claimed in claim 1, said compound being β-hydroxy-β-[para-(1-cyclopentenyl)-phenyl]-butyric acid or a therapeutically acceptable salt thereof.

5. A compound as claimed in claim 1, said compound being β-hydroxy-β-[para(1-cycloheptenyl)-phenyl]-butyric acid or a therapeutically acceptable salt thereof.

* * * * *